United States Patent
Motzing et al.

(10) Patent No.: US 11,667,163 B2
(45) Date of Patent: Jun. 6, 2023

(54) ANTI-RATTLE HITCH TIGHTENER

(71) Applicant: Curt Manufacturing, LLC, Eau Claire, WI (US)

(72) Inventors: Graham A. Motzing, Eau Claire, WI (US); Joel D. Diller, Eau Claire, WI (US); Robert G. Fehr, Colfax, WI (US)

(73) Assignee: CURT Manufacturing, LLC, Eau Claire, WI (US)

( * ) Notice: Subject to any disclaimer, the term of this patent is extended or adjusted under 35 U.S.C. 154(b) by 0 days.

(21) Appl. No.: 17/592,352

(22) Filed: Feb. 3, 2022

(65) Prior Publication Data

US 2023/0098346 A1   Mar. 30, 2023

Related U.S. Application Data

(60) Provisional application No. 63/250,499, filed on Sep. 30, 2021.

(51) Int. Cl.
*B60D 1/24* (2006.01)
(52) U.S. Cl.
CPC .................... *B60D 1/241* (2013.01)
(58) Field of Classification Search
CPC .................................................. B60D 1/241
See application file for complete search history.

(56) References Cited

U.S. PATENT DOCUMENTS

| | | |
|---|---|---|
| D347,163 S * | 5/1994 | Issard .............................. D8/387 |
| 5,879,102 A | 3/1999 | Koliopoulos |
| 6,131,938 A | 10/2000 | Speer |
| 7,600,774 B1 | 10/2009 | Speer et al. |
| D629,465 S * | 12/2010 | Frantz |
| 8,262,121 B2 | 9/2012 | Beck |
| 9,073,396 B2 | 7/2015 | Laurer et al. |
| 9,981,513 B2 | 5/2018 | Belinky et al. |
| 2002/0145270 A1 | 10/2002 | Williams |
| 2015/0097356 A1* | 4/2015 | Breeden, III ............ B60D 1/06 280/507 |
| 2018/0134105 A1* | 5/2018 | Wyers .................... B60D 1/065 |
| 2019/0071024 A1 | 3/2019 | Uebler |

* cited by examiner

*Primary Examiner* — Kevin Hurley
(74) *Attorney, Agent, or Firm* — Shewchuk IP Services, LLC; Jeffrey D. Shewchuk

(57) ABSTRACT

A hitch tightener is used around the lip of a hitch receiver tube and a shank inserted into the hitch receiver tube. The hitch tightener has a U-bolt with two threaded legs, and a crossbar with throughholes for the legs of the U-bolt, positioned so the crossbar and the U-bolt encircle the shank and the receiver tube lip. A standard threaded nut holds the crossbar onto one of the legs, and a cam lock lever is pivotally attached on the other leg by a threaded trunnion nut. When the cam lock lever is pivoted from its opened position to its closed position, it moves the crossbar toward the connecting portion of the clamp component, tightening the hitch tightener around shank and lip.

20 Claims, 7 Drawing Sheets

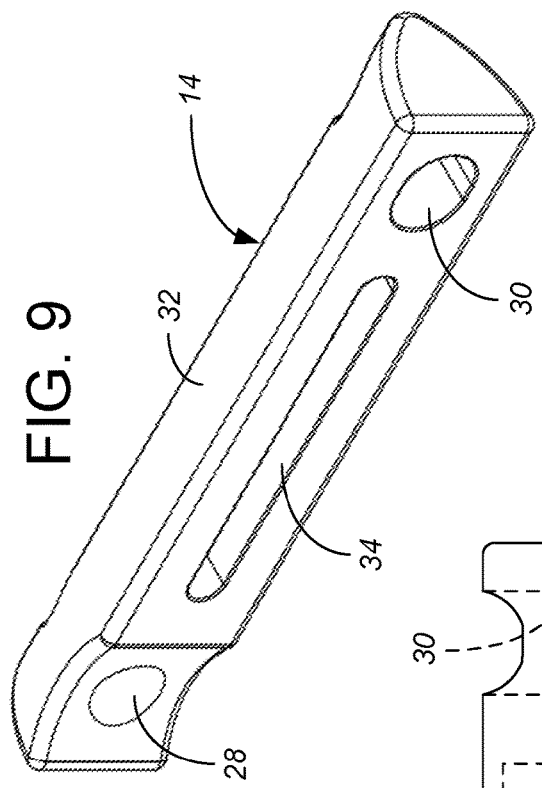
FIG. 9
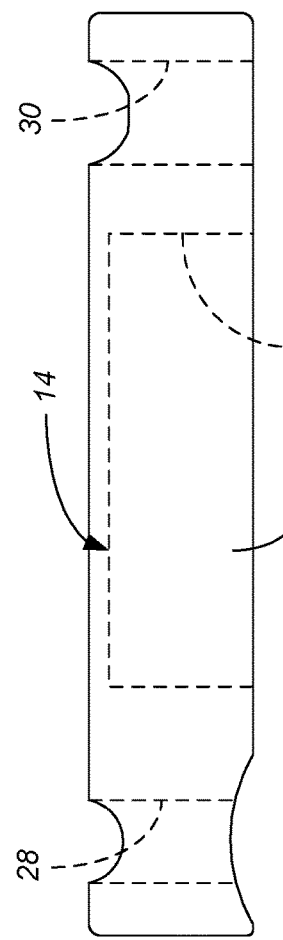
FIG. 10
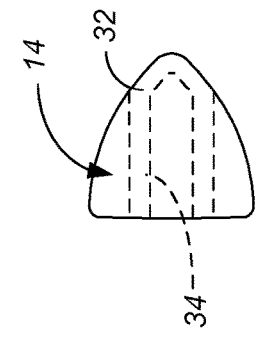
FIG. 12
FIG. 11

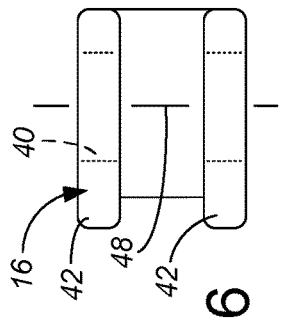
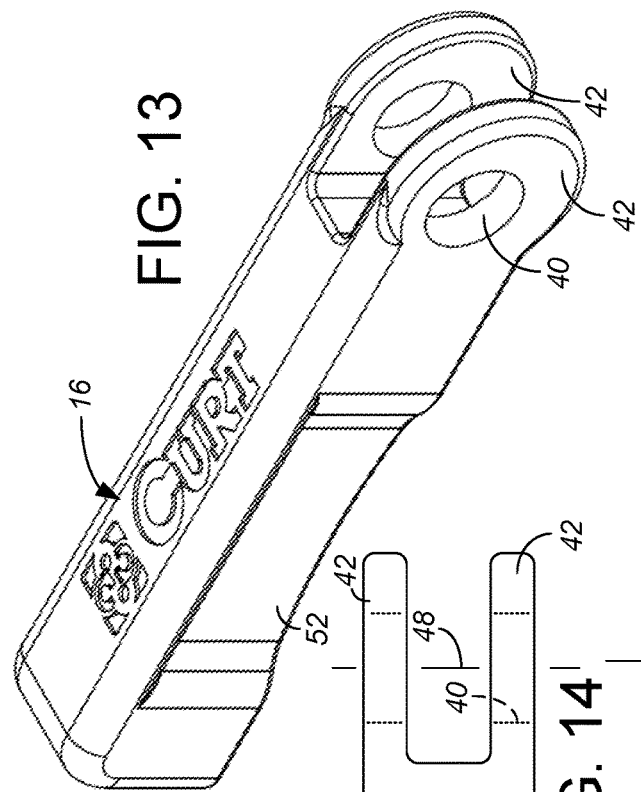
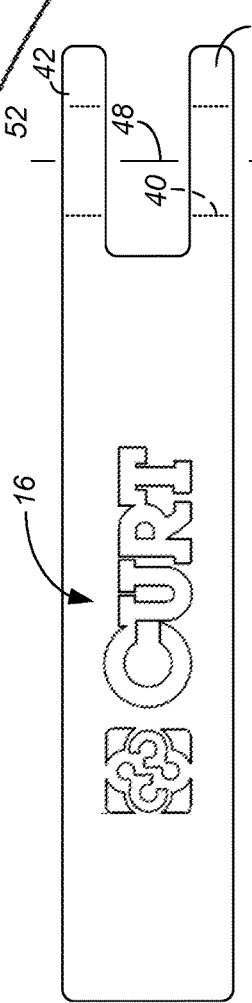
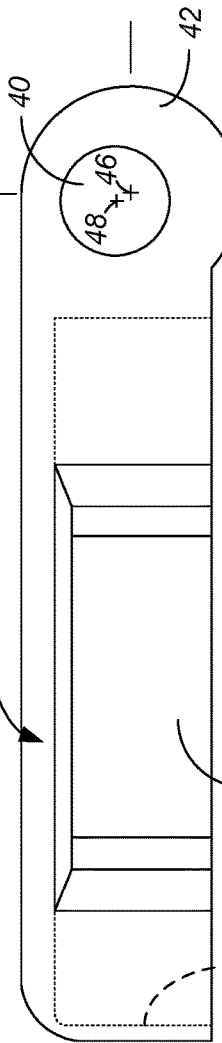
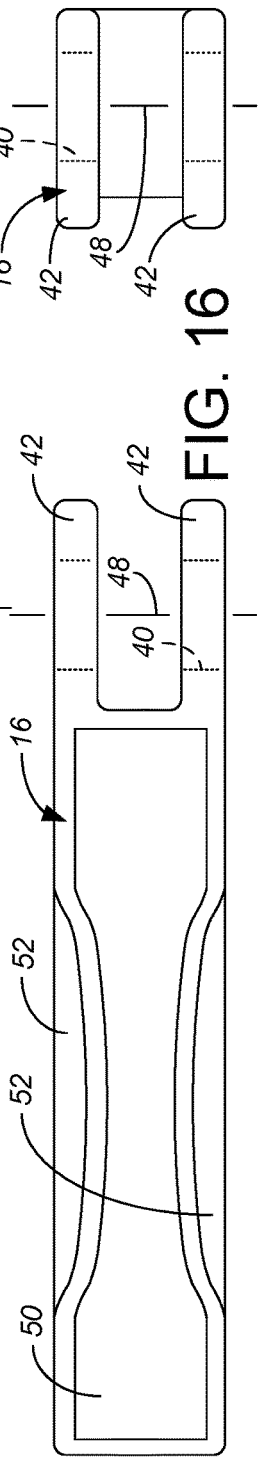

ANTI-RATTLE HITCH TIGHTENER

CROSS-REFERENCE TO RELATED APPLICATION(S)

The present application claims priority from U.S. Provisional Application No. 63/250,499 entitled ANTI-RATTLE HITCH TIGHTENER filed Sep. 20, 2021, incorporated herein by reference.

BACKGROUND OF THE INVENTION

The present application relates to hitches used between a towing vehicle and a towed load such as a trailer or other accessory, and particularly to hitches which utilize a shank received within a hitch receiver tube mounted on back of the towing vehicle. The connections between the shank and the hitch receiver tube require a certain amount of clearance to enable the shank to be inserted, slid to the correct longitudinal position, and removed from the hitch receiver tube. This clearance can lead to relative movement between the shank and the hitch receiver tube, often resulting in relative side to side or vertical movement causing rattling as the vehicle proceeds over bumps, turns, hills, troughs, accelerations and decelerations on the roadway.

There are many anti-rattle hitch tightener devices currently on the market, such as the type taught by FIGS. 28-32 of U.S. Pat. No. 5,879,102, incorporated by reference. A similar anti-rattle hitch tightener device is taught by U.S. Pat. No. 6,131,938, also incorporated by reference. Such anti-rattle hitch tightener devices include a U-bolt, a crossbar with two openings that receive the two ends of the U-bolt, and a nut (two total) for each threaded leg of the U-bolt. In many versions, the crossbar is provided as an angled plate. The anti-rattle hitch tightener of such devices is assembled around the shank inserted into the hitch receiver tube so it bridges across the connection between the shank and the receiver tube, with the two nuts then tool-tightened to bias the shank against one side of the hitch receiver tube. While such anti-rattle hitch tighteners are robust, cost-effective and simple to construct, improvements are needed. One particular difficulty for consumers is correctly torquing the two nuts, so they will not loosen and the towing vehicle proceeds through bumps and vibrations and through thermal cycling, but still be loosenable when desired possibly after months or years of use in dirty, corrosive exterior conditions.

Anti-rattle shank/receiver tube devices should be easy to use, both in attaching, tightening and detaching. Anti-rattle shank/receiver tube devices should be strong and secure, minimizing the possibilities of wear and/or damage between the receiver tube and the shank. Anti-rattle shank/receiver tube devices should be robust for a long product life, while still being light in weight and low in cost. Better anti-rattle solutions are needed.

BRIEF SUMMARY OF THE INVENTION

The present invention is a hitch tightener, used around the lip of a hitch receiver tube and a shank inserted into the hitch receiver tube, as well as a method of using the hitch tightener to bias the shank against a side of the hitch receiver tube. The hitch tightener has a clamp component such as a U-bolt, which has two legs and a connecting portion extending between the two legs. A crossbar has openings for each of the first and second legs, and is positioned so the crossbar and the clamp component encircle the shank and the receiver tube lip. A cam lock lever is pivotally attached on one of the legs. When the cam lock lever is pivoted from its opened position to its closed position, it moves the crossbar toward the connecting portion of the clamp component, tightening the hitch tightener around shank and lip. The cam lock lever preferably has a recess which receives a nut threaded on the other leg, which while in the closed position prevents the nut from loosening.

BRIEF DESCRIPTION OF THE DRAWINGS

FIG. 9 is a perspective view of the cam lock crossbar used in the anti-rattle hitch tightener device of FIGS. 1-8.

FIG. 10 is a side view of the cam lock crossbar of FIG. 9.

FIG. 11 is a plan view of the cam lock crossbar of FIGS. 9 and 10, in the direction from the shank axis.

FIG. 12 is an end view of the cam lock crossbar of FIGS. 9-11.

FIG. 13 is a perspective view of the cam lock lever used in the anti-rattle hitch tightener device of FIGS. 1-8.

FIG. 14 is a plan view of the cam lock lever of FIG. 13, in the direction toward the shank axis.

FIG. 15 is a side view of the cam lock lever of FIGS. 13 and 14.

FIG. 16 is a plan view of the cam lock lever of FIGS. 13-15, in the direction toward the shank axis.

FIG. 17 is an end view of the cam lock crossbar of FIGS. 13-16.

While the above-identified drawing FIGS. set forth a preferred embodiment, other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principles of this invention.

DETAILED DESCRIPTION OF THE PREFERRED EMBODIMENTS

Figure 6:
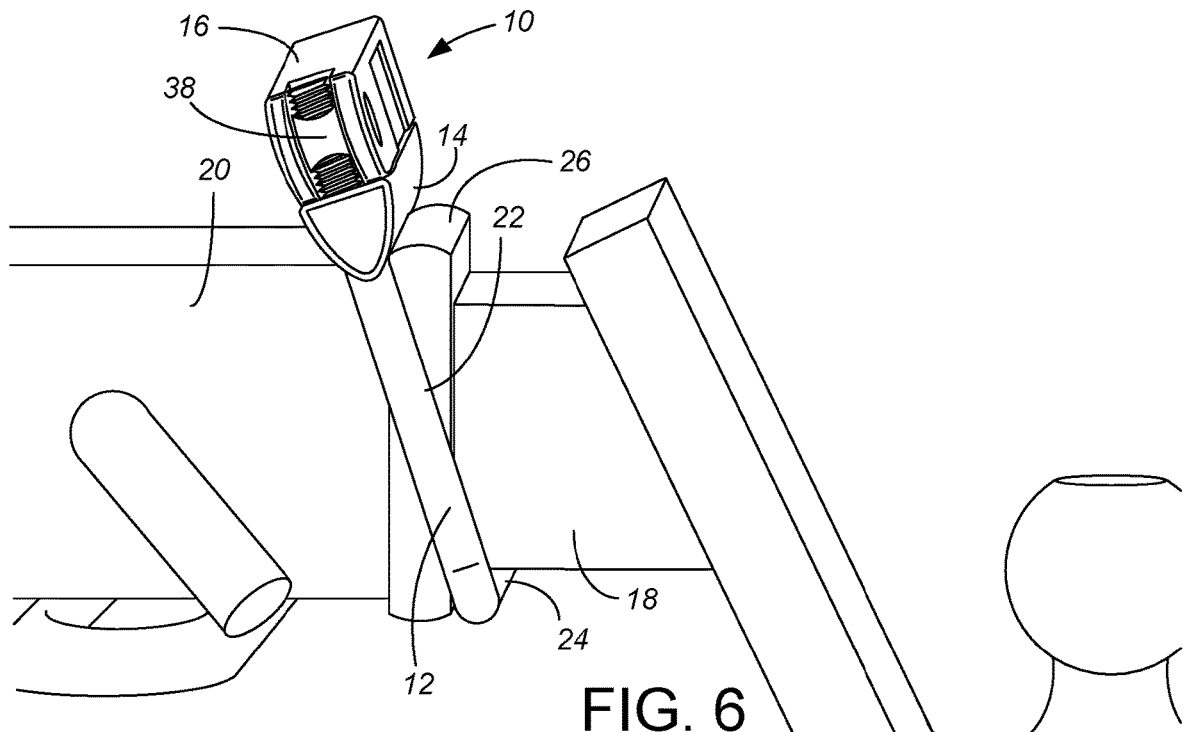
FIG. 6 is a view, mostly from the side but in slight perspective, of the anti-rattle hitch tightener device of FIGS. 1-5 in a first usage position.
Figure 7:
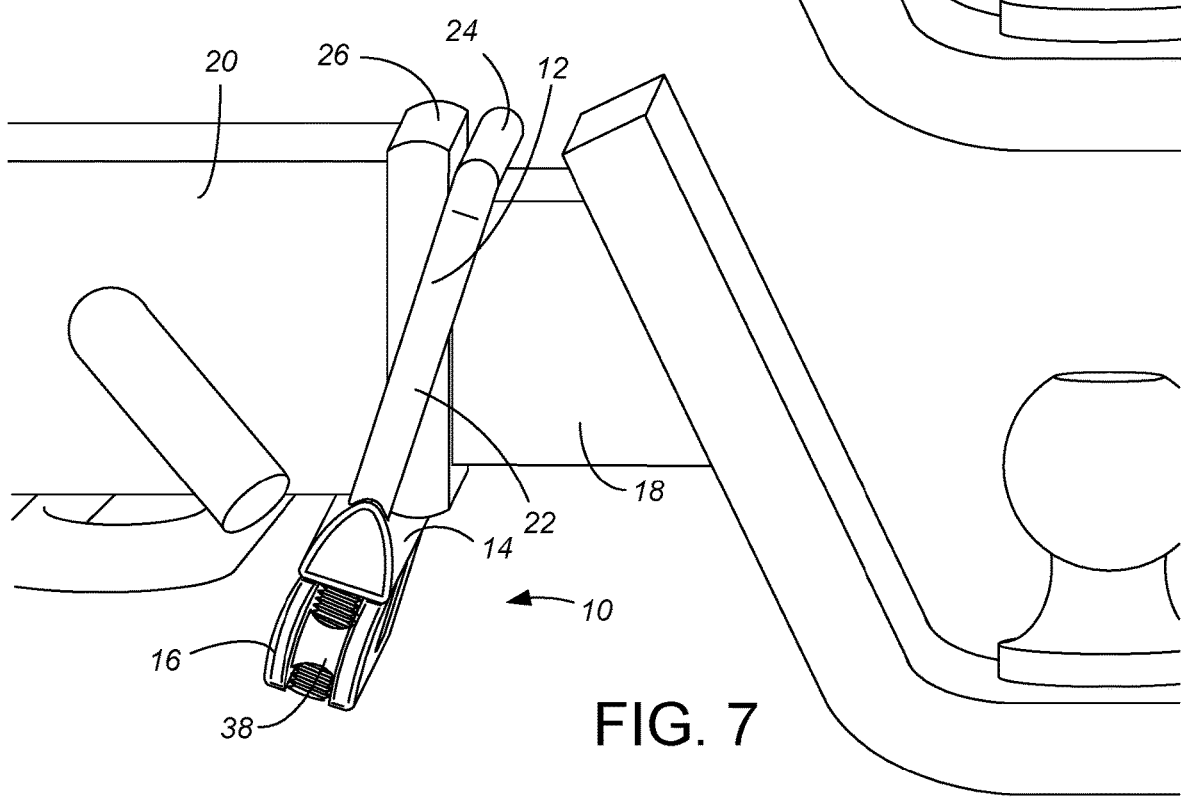
FIG. 7 is a view, mostly from the side but in slight perspective, of the anti-rattle hitch tightener device of FIGS. 1-6 in a second usage position.
Figure 8:
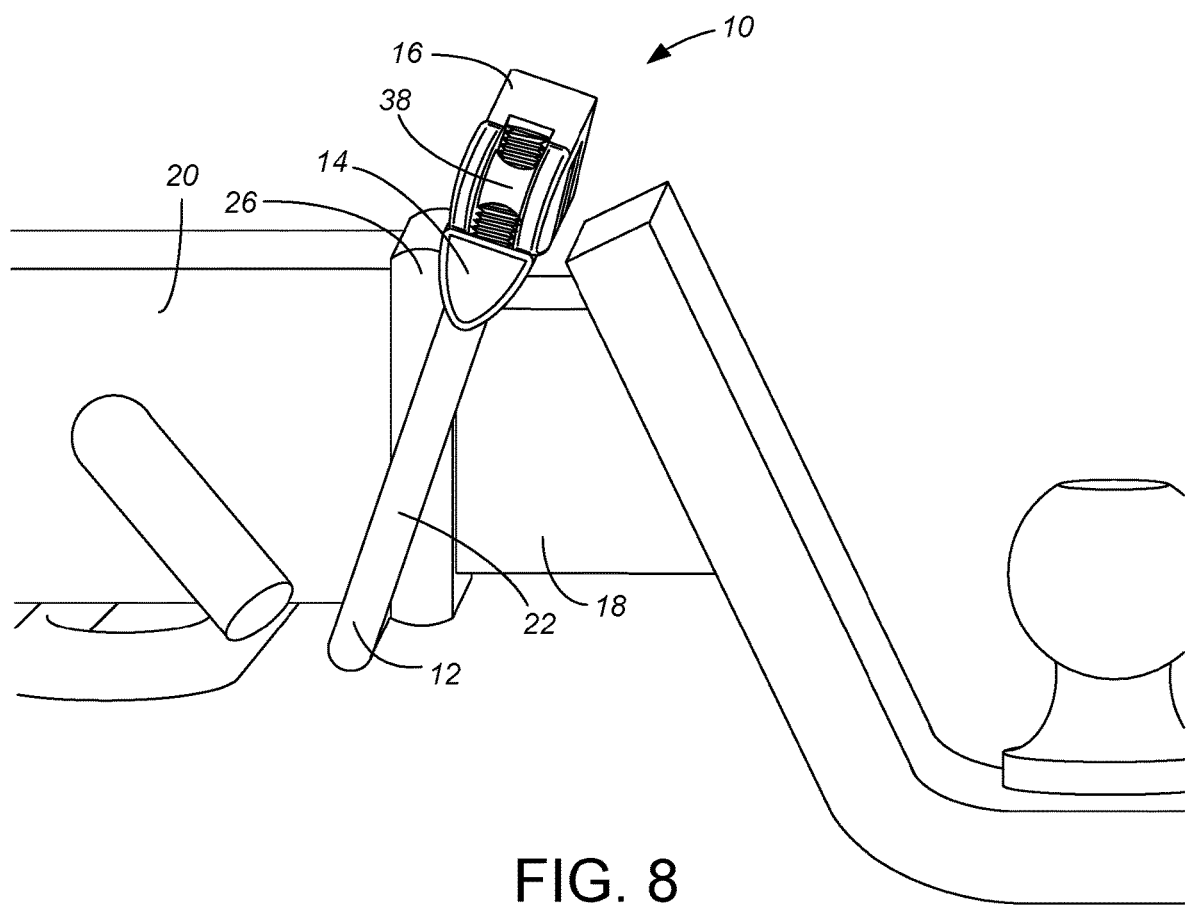
FIG. 8 is a view, mostly from the side but in slight perspective, of the anti-rattle hitch tightener device of FIGS. 1-7 in a third usage position.

The invention is an anti-rattle hitch tightener 10 that includes a first clamp component such as a U-bolt 12 used in conjunction with a cam lock crossbar 14 and a cam lock lever 16. The U-bolt 12 is sized to mate with the size and shape of the shank 18, while extending around a portion of the end of the receiver tube 20 as shown in FIGS. 6-8.

The U-bolt 12 has two legs 22 each extending from a connecting portion 24. For instance, the preferred U-bolt 12 can be formed by bending of a ⅜$^{th}$ inch diameter cylindrical steel stock (such as stainless steel or zinc-coated high strength steel for corrosion resistance) to define the two legs 22 extending at right angles from the connecting portion 24. Each leg 22 preferably has a threaded end, such as a 24 UNF thread extending over the last 1 inch of the length of the leg 22. The lengths of the legs 22 and the connecting portion 24 are sized for the size and profile of the receiver tube 20 with which the anti-rattle hitch tightener 10 is intended to be used. The preferred embodiment 10 shown is intended to be used with a receiver tube 20 with about a 2×2 inch interior space for receiving a 2×2 inch square cross-section shank 18, and such receiver tubes typically have an outer size which is about 2.5×2.5 inch square around the shank axis, with a lip 26 on the receiver tube 20 which is about 3×3 inch square and about ½ inch long. For this size and shape of receiver tube 20, the preferred legs 22 of the U-bolt 12 are about 4 inches long from the inner side of the connecting portion 24, with a spacing of about a 3⅛ inch gap between the inner sides of the legs 22.

Figure 1:
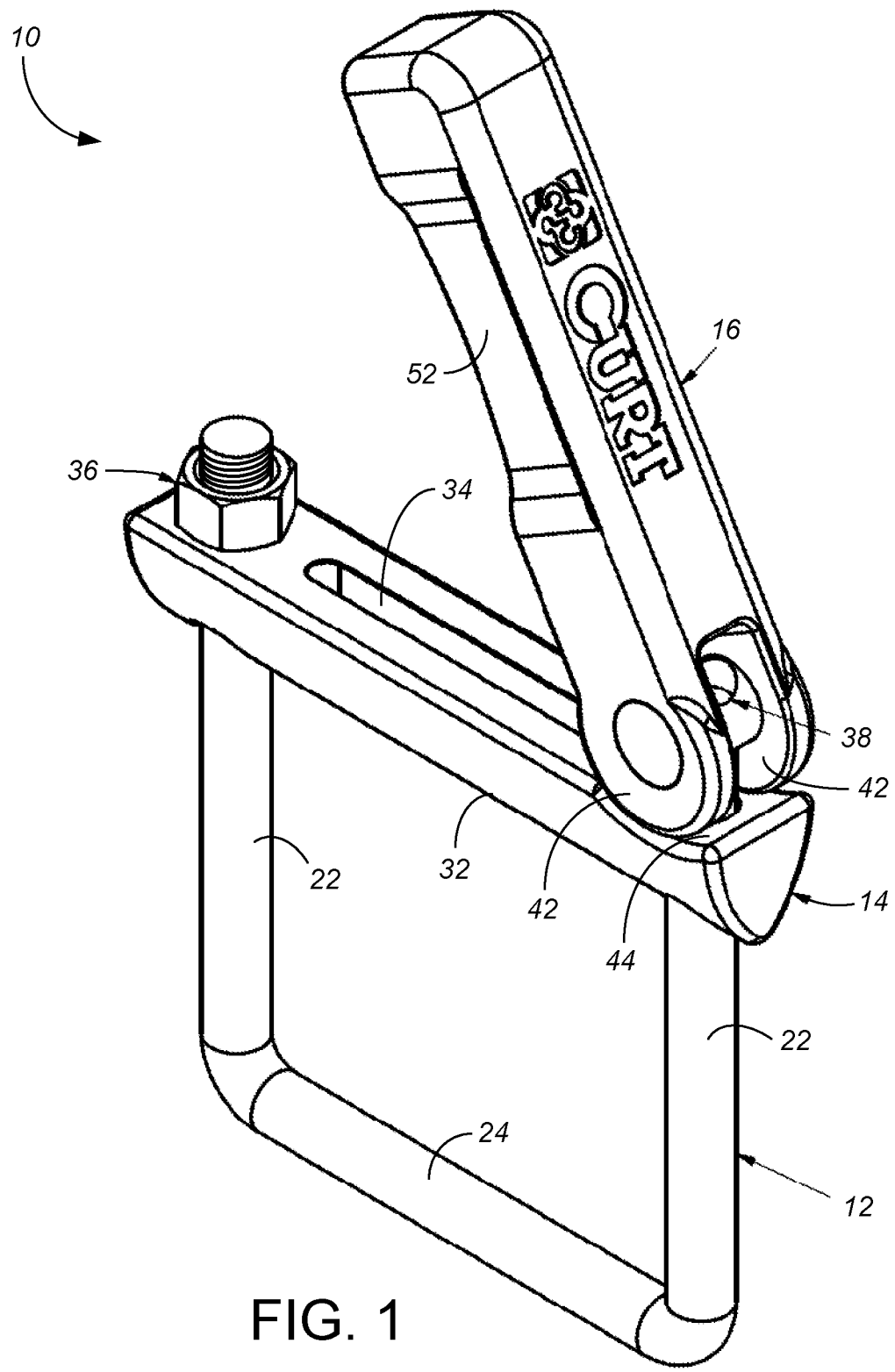
FIG. 1 is a perspective view of an anti-rattle hitch tightener device in accordance with the present invention, in an opened, untightened position.
Figure 2:
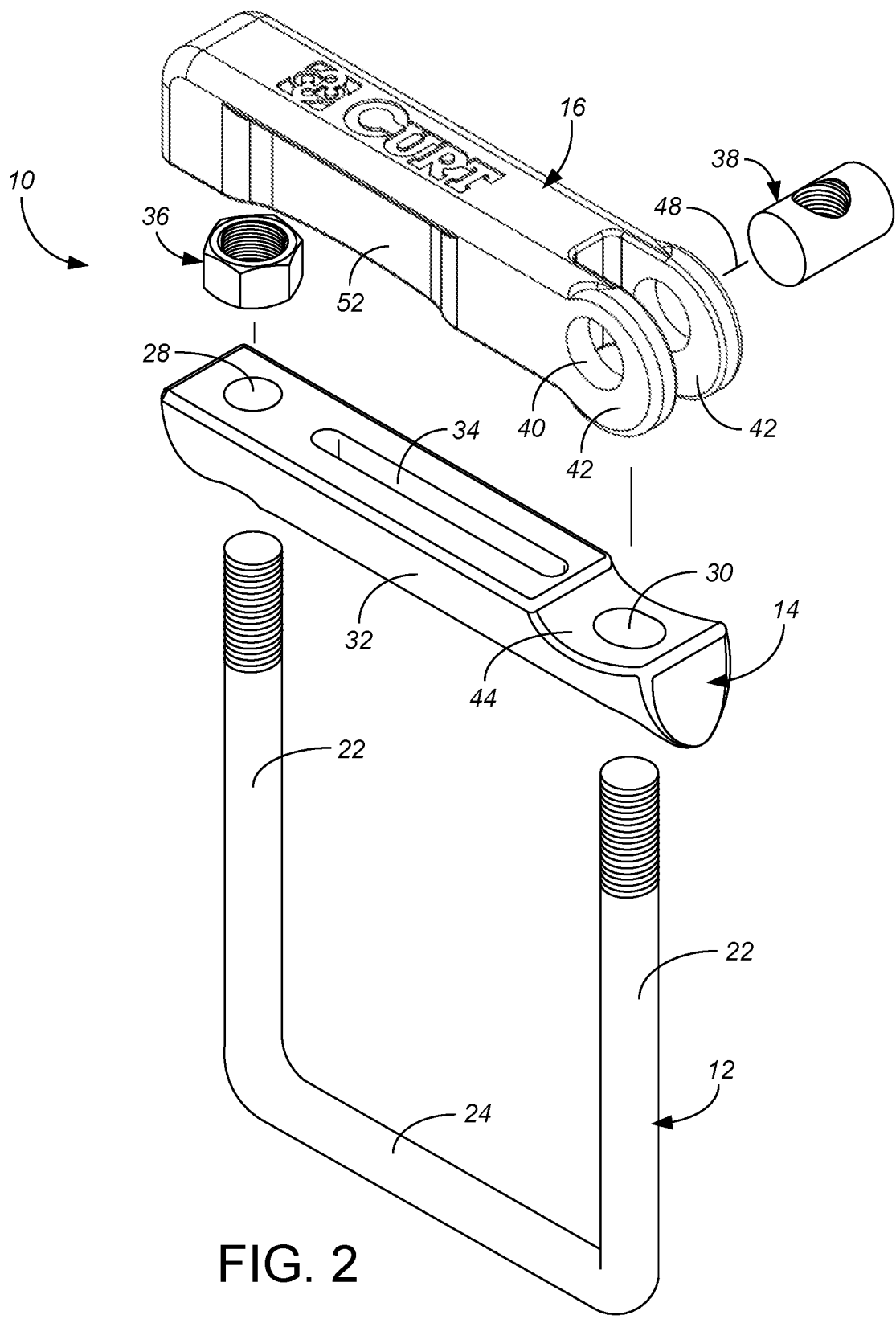
FIG. 2 is an exploded, perspective view of the anti-rattle hitch tightener device of FIG. 1.
Figure 3:
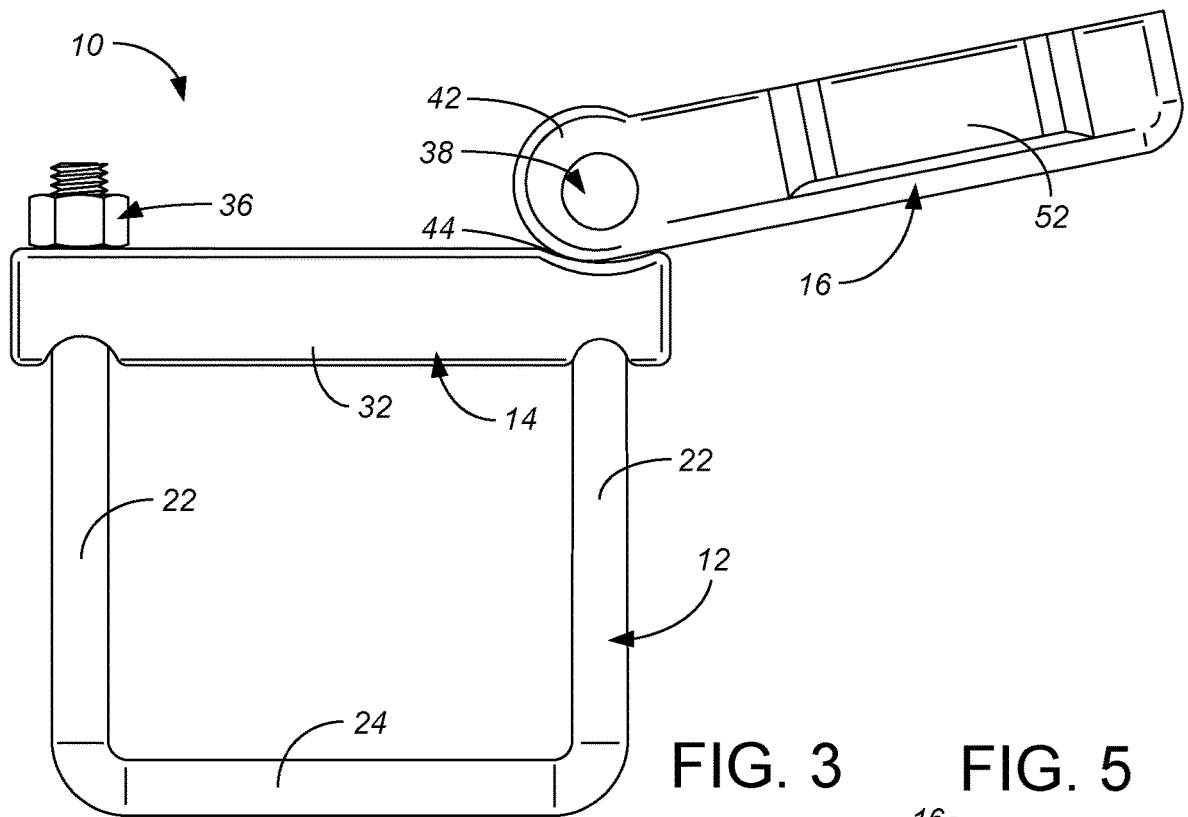
FIG. 3 is an end view of the anti-rattle hitch tightener device of FIGS. 1 and 2 in an opened, untightened position.
Figure 4:
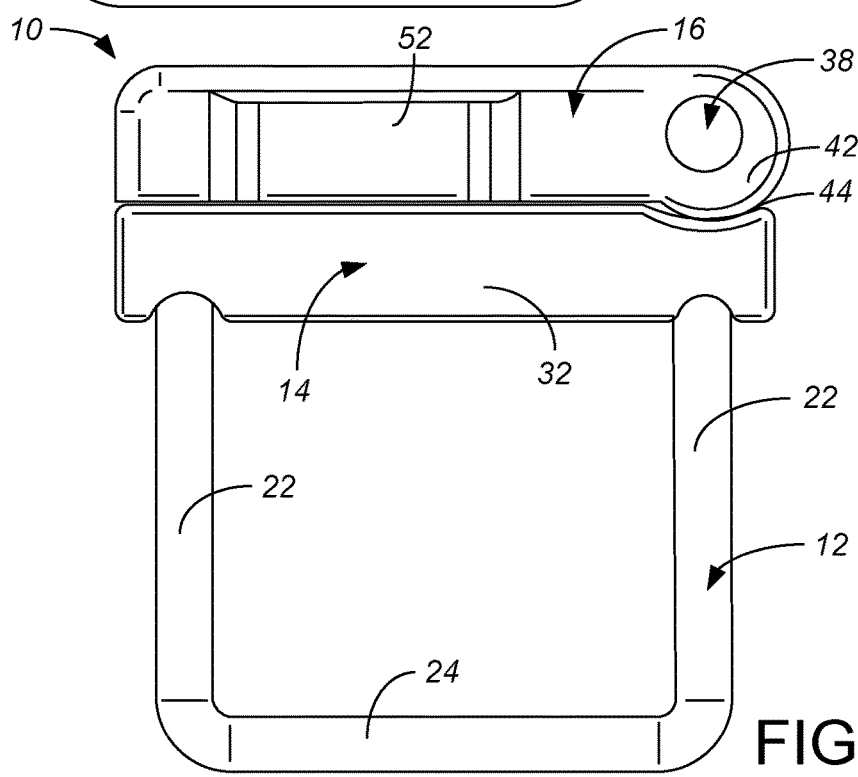
FIG. 4 is an end view of the anti-rattle hitch tightener device of FIGS. 1-3 in a closed, tightened position.
Figure 5:
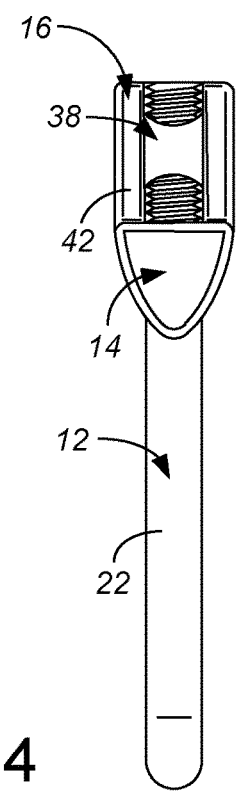
FIG. 5 is a side view of the anti-rattle hitch tightener device of FIGS. 1-4 in the closed, tightened position.

The cam lock crossbar 14 includes two leg holes 28, 30, spaced sufficiently so the cam lock crossbar 14 can be placed onto the ends of the legs 22 with the ends of the legs 22 extending through the leg holes 28, 30. The cam lock crossbar 14 includes a biasing side 32 between the leg holes 28, 30, shaped to be received either against the shank 18 adjacent the lip 26 or against the inside end of the lip 26 and the outside of the receiver tube 20. For instance, the biasing side 32 of the preferred cam lock crossbar 14 has a rounded triangular shape best shown in side view of FIG. 5. While the preferred cam lock crossbar 14 is bilaterally symmetrical and includes the rounded triangular cross-sectional shape though-out its length, only the biasing side 32 between the leg holes 28, 30 makes contact with the receiver tube 20 and possibly the shank 18, and the cross-sectional shape of the ends of the cam lock crossbar 14 is largely aesthetic. Preferably the leg holes 28, 30 are sized significantly larger than the leg diameter, giving some flexibility to the orientation of the cam lock crossbar 14 (such as at least about +−2°) relative to the orientation of the U-bolt 12. For instance, one preferred leg hole 28 is cylindrical with a 0.4 inch diameter (for the ⅜ inch diameter leg 22), while the other preferred leg hole 30 is oblong with a 0.4 inch width and a 0.6 inch length. The preferred cam lock crossbar 14 is formed from a strong material, such as being cast from aluminum for its corrosion resistance and lightweight strength. A recess 34 may be included within the cam lock crossbar 14, to reduce the amount of material used and the corresponding weight and cost of the cam lock crossbar 14.

A threaded nut 36 is rotatably threaded onto one of the legs 22 to hold the cam lock crossbar 14 to the U-bolt 12. The preferred legs 22 are identical, so it does not matter which leg 22 is used for the nut 36. The threaded nut 36 preferably has at least one and more preferably multiple exterior flats used for rotational torqueing of the nut 36, such as a hexagonal steel nut, widely available at low cost. The threaded nut 36 is preferably used with the circular leg hole 28 on the crossbar 14, providing a seat which contacts all of the circular lower surface of the nut 36 without requiring a washer.

A threaded trunnion nut 38 is placed within a trunnion through-hole 40 within two cam ears 42 of the cam lock lever 16, and then rotatably threaded onto the other leg 22 of the U-bolt 12. The trunnion nut 38 preferably has a cylindrical outer profile, providing a pivot bearing for the cam lock lever 16. For instance, the preferred trunnion nut 38 can be formed of steel (such as stainless steel or zinc-coated high strength steel for corrosion resistance), with a ½ inch cylindrical outer diameter and a 0.8 inch length. The trunnion nut 38 could alternatively be formed of other material used for bearing surfaces, such as brass. The outer surface of the trunnion nut 38 can be lubricated with grease or a similar lubricant (not shown) if desired to assist in acting as a pivot bearing for the cam lock lever 16. Because the trunnion nut 38 doesn't directly contact the crossbar 14 and only the car ears 42 need to press against the crossbar 14, the trunnion nut 38 is preferably used on the leg 22 that extends through the oblong leg hole 30 on the crossbar 14.

The cam lock lever 16 includes two cam ears 42 which mate against the cam lock crossbar 14. For instance, the cam ears 42 can be cylindrical with an outer diameter of about 1 inch. While the cam lock crossbar 14 could include a flat contact surface for the cam lock lever 16, more preferably a slight recess 44 is provided. The cam ears 42 each define a trunnion nut through-hole 40 matching the size of the outside surface of the trunnion nut 38, such that the trunnion nut 38 acts as a pivot pin for the cam lock lever 16. The oblong leg hole 30 is preferably positioned fully between the two cam ears 42, oriented so the length of the oblong leg hole 30 doesn't prevent contact between the cam ears 42 and the crossbar 14.

The axis 46 defined by the exterior shape of the cam ears 42 is offset from the axis 48 of the trunnion through holes 40. As best seen in FIG. 15, the location of the cam axis 46 relative to the trunnion axis 48 preferably includes both vertical and horizontal offset components, in the three-to-six o'clock quadrant when oriented as shown in FIG. 15, for best operation of the device. The preferred dimensions, for use with a 0.52 inch radius cylindrical cam ears 42, offset the axes 46, 48 amounts of 0.07 inches vertically and 0.035 inches horizontally. Because of this offset, a rotation of the cam lock lever 16 from a fully opened to a fully closed position, while the cam lock lever 16 remains in contact with the cam lock crossbar 14, will push the cam lock crossbar 14 about 0.14 inches toward the connecting portion 24 of the U-bolt 12. While other dimensions might provide a similar spring force, this offset and cam size has proven workable for a proper tensioning and tightening force which can be achieved by hand, and also sufficiently biasing the cam lock lever 16 closed so it maintains closure and does not fly open during towing use even over rough roads. The preferred biasing force keeping the cam lock bar closed is effective regardless of orientation of the hitch tightener 10, i.e., regardless of whether the cam lock lever 16 is used above, to the side, or beneath the shank 18.

The cam lock lever 16 includes a recess 50, with at least one flat and more preferably two flats, with sufficient depth and spacing to mate with flat(s) on the nut 36. The recess 50 can be further enlarged to reduce the weight and cost of the material for the cam lock lever 16. Two indentations 52 can be provided on opposing sides of the cam lock lever 16. The preferred cam lock lever 16 is formed from a strong material, such as being cast from aluminum for its corrosion resistance and lightweight strength.

The hitch tightener 10 is used by placing it around the interface between the receiver tube 20 and the shank 18, in contact with the receiver tube 20 inside the lip 26 and with the legs 22 extending over the lip 26 so the hitch tightener 10 also makes contact with the shank 18. The hitch tightener 10 can be used in any desired orientation, i.e., with the cam lock lever 16 being above (shown in FIGS. 6 and 8), to the side (not shown), or beneath the shank 18 (shown in FIG. 7).

It can be used either with the connecting portion 24 contacting the shank 18 or with the crossbar 14 contacting the shank 18.

In use, after the U-bolt 12 and crossbar 14 is placed over and/or assembled around the shank 18 and receiver tube 20 as shown in any of FIGS. 6-8, the single nut 36 can be finger tightened without any tool while the cam lock lever 16 is opened. The trunnion nut 38 can similarly be tightened by 360° rotations of the cam lock lever 16 about the second leg 22 of the U-bolt 12. After both the nut 36 and the trunnion nut 38 are finger tightened, the cam lock lever 16 is then pivoted over by hand from the opened position to the closed position. The cam action causes tightening of the crossbar 14 toward the connecting portion 24 of the U-bolt 12, pulling the shank 18 tightly against one side of the receiver tube 20. The recess 50 in the cam lock lever 16 fits over the nut 36, preventing the nut 36 from rotating loose during use while towing. The indentations 52 on the cam lock lever 16 enable better grasping for opening the cam lock lever 16 from the closed position against the biasing force of the cam.

By pulling the shank 18 tightly against one side of the receiver tube 20, any rattling, clanking or relative movement between the shank 18 and the receiver tube 20 is eliminated. Noise during use of the hitch is reduced. Wear between the shank 18 and the receiver tube 20 is similarly reduced. The present invention thus provides an elegant, low cost solution which is easily assembled and used without requiring any tools.

Although the present invention has been described with reference to preferred embodiments, workers skilled in the art will recognize that changes may be made in form and detail without departing from the spirit and scope of the invention. In particular, all of the dimensions and materials, unless included in the claims, are exemplary only.

The invention claimed is:

1. A hitch tightener comprising:
a clamp component for wrapping around a lip of a hitch receiver tube, the clamp component comprising a connecting portion extending between a first leg and a second leg;
a crossbar receivable on the first and second legs and having openings for each of the first and second legs, and
a cam lock lever, pivotally attached relative to the first leg and pivotally movable between an opened position and a closed position, the cam lever being in contact with the crossbar such that pivotal movement of the cam lock lever from the opened position to the closed position moves the crossbar toward the connecting portion of the clamp component, tightening the hitch tightener around the lip of the hitch receiver tube and a shank inserted into the hitch receiver tube.

2. The hitch tightener of claim 1, wherein the clamp component is a U-bolt.

3. The hitch tightener of claim 2, wherein the first leg of the U-bolt is externally threaded, wherein the cam lock lever is pivotally attached to the first leg with an internally threaded trunnion nut screwed onto the first leg, the trunnion nut providing a pivot pin for the cam lock lever.

4. The hitch tightener of claim 3, wherein the cam lock lever comprises two cam ears in contact with the crossbar.

5. The hitch tightener of claim 4, wherein the cam ears are cylindrical defining a cam axis which is offset from a pivot axis of the trunnion nut.

6. The hitch tightener of claim 5, wherein the crossbar comprises a recess for the cam ears.

7. The hitch tightener of claim 3, wherein the second leg of the U-bolt is externally threaded, and further comprising an internally threaded nut received on the second leg and holding the crossbar to the second leg.

8. The hitch tightener of claim 7, wherein the cam lock lever comprises a recess receiving the internally threaded nut in the closed position.

9. The hitch tightener of claim 8, wherein the recess comprises a flat, which in the closed position mates against a flat of the internally threaded nut holding the crossbar to the second leg.

10. The hitch tightener of claim 1, wherein the openings in the crossbar for each of the first and second legs are throughholes, and wherein one of the throughholes in the crossbar is larger than the other throughhole in the crossbar.

11. The hitch tightener of claim 9, wherein one of the throughholes in the crossbar is an oblong throughhole, and wherein the cam lock lever comprises two cam ears in contact with the crossbar, with the oblong throughhole oriented so its length extends between the two cam ears.

12. The hitch tightener of claim 1, wherein the cam lock lever comprises indentations for grasping the cam lock lever when opening the cam lock lever from the closed position to the opened position.

13. The hitch tightener of claim 1, wherein the crossbar has a biasing side with a generally triangular cross-sectional shape, for contacting the lip of the hitch receiver tube.

14. The hitch tightener of claim 13, wherein the biasing side of the crossbar is bilaterally symmetrical.

15. A hitch tightener comprising:
a U-bolt for wrapping around a lip of a hitch receiver tube, the U-bolt comprising a connecting portion extending between a first leg and a second leg, the first leg being externally threaded and the second leg being externally threaded;
a crossbar receivable on the first and second legs and having openings for each of the first and second legs;
an internally threaded trunnion nut screwed onto the first leg;
a lock lever, pivotally attached relative to the first leg by the trunnion nut and pivotally movable between an opened position and a closed position, such that the trunnion nut provides a pivot pin for the lock lever; and
an internally threaded nut screwed onto the second leg and holding the crossbar to the second leg;
wherein the lock lever comprises a recess which receives the internally threaded nut on the second leg when in the closed position.

16. The hitch tightener of claim 15, wherein the recess comprises a flat, which in the closed position mates against a flat of the internally threaded nut holding the crossbar to the second leg.

17. The hitch tightener of claim 15, wherein the openings in the crossbar for each of the first and second legs are throughholes, and wherein one of the throughholes in the crossbar is larger than the other throughhole in the crossbar.

18. The hitch tightener of claim 17, wherein one of the throughholes in the crossbar is an oblong throughhole, and wherein the lock lever comprises two cam ears in contact with the crossbar, with the oblong throughhole oriented so its length extends between the two cam ears.

19. The hitch tightener of claim 15, wherein the lock lever comprises indentations for grasping the lock lever when opening the lock lever from the closed position to the opened position.

20. A method of a tightening a shank inserted into a hitch receiver tube against a side of the hitch receiver tube, comprising:

placing a U-bolt of a hitch tightener into a position where it extends around a lip of the hitch receiver tube and around the shank, the U-bolt comprising a connecting portion extending between a first leg and a second leg, with a crossbar of the hitch tightener received on the first and second legs; and pivoting a lock lever of the hitch tightener, pivotally attached relative to the first leg, between an opened position and a closed position, thereby moving the crossbar toward the connecting portion of the U-bolt, tightening the hitch tightener around the lip of the hitch receiver tube and the shank inserted into the hitch receiver tube.

\* \* \* \* \*